United States Patent

[11] 3,586,966

| [72] | Inventors | Robert W. Haisty<br>1237 Mohawk, Richardson, Tex. 75080;<br>Heinz M. Krebs, 700 Stuttgart Vaihingen,<br>Weinbergweg 68, Germany |
|---|---|---|
| [21] | Appl. No. | 700,401 |
| [22] | Filed | Jan. 25, 1968 |
| [45] | Patented | June 22, 1971 |

[54] APPARATUS AND METHODS FOR ELECTRODELESS MEASUREMENT OF RESISTIVITY AND PROXIMITY OF MATERIALS
22 Claims, 21 Drawing Figs.

[52] U.S. Cl. ............................................. 324/40, 324/34
[51] Int. Cl. ..................................................... G01r 33/00
[50] Field of Search ........................................... 324/40, 34 PS, 34; 340/258 C; 331/65

[56] References Cited
UNITED STATES PATENTS

| 1,943,619 | 1/1934 | Mudge et al. | 324/34 |
| 2,939,073 | 5/1960 | Eul | 324/40 X |
| 2,211,017 | 8/1940 | Leifer et al. | 324/34 |
| 2,487,523 | 11/1949 | Coake | 324/34 |
| 2,772,393 | 11/1956 | Davis | 324/40 |
| 2,807,720 | 9/1957 | Charles | 324/34 |
| 2,920,268 | 1/1960 | Young | 324/40 X |
| 3,315,157 | 4/1967 | Watanabe et al. | 324/62 B |
| 3,340,400 | 9/1967 | Quittner | 324/61 X |

OTHER REFERENCES
Donner; IBM TECH. DISCL. BUL; Vol. 6, 05; Oct. 1963; pp. 24 & 25, 340—258c

*Primary Examiner*—Alfred E. Smith
*Attorney*—Kanz & Glaser

ABSTRACT: Disclosed are methods and apparatus for contact-free or electrodeless measurement of specific resistivity and photoconductivity of materials. Also disclosed are methods and apparatus for determining relative motion and position of a body. The apparatus includes inductance means and oscillator circuitry for determining eddy current losses in a material moved through or near the inductance means. Apparatus and methods are also disclosed for determining eddy current losses in materials inductively and/or capacitively coupled with such circuitry.

INVENTORS
ROBERT W. HAISTY
HEINZ M. KREBS

*Jack A Kanz*
ATTORNEY

INVENTORS
ROBERT W. HAISTY
HEINZ M. KREBS

*Jack A. Kanz*
ATTORNEY

INVENTORS
ROBERT W. HAISTY
HEINZ M. KREBS

*Jack A. Kanz*
ATTORNEY

INVENTORS
ROBERT W. HAISTY
HEINZ M. KREBS

ATTORNEY

APPARATUS AND METHODS FOR ELECTRODELESS MEASUREMENT OF RESISTIVITY AND PROXIMITY OF MATERIALS

This invention relates to methods and apparatus for measuring specific resistivity of materials such as conductors, semiconductors, and semi-insulators. The principles of the invention are also applicable to methods and apparatus for determining photoconductivity of materials, and to methods and apparatus for measuring motion or position of a body to determine such qualities as velocity, acceleration, force, frequency and amplitude of vibration, pressure, expansion and the like. More particularly, the invention relates to methods and apparatus for electrodeless or contact-free measurement of such characteristics based on determination of eddy current losses in a sample of the material which is moved through or in the vicinity of an inductance means, such determinations being measured by an oscillator circuit inductively and/or capacitively coupled with said material. Measurement of specific resistivity in accordance with the invention is possible over a much wider range than previously described eddy current or other electrodeless methods.

It is well known that if a conductor is placed in an inductor carrying alternating current, eddy currents are induced in the conductor. The eddy currents reduce the magnetic flux resulting in a lower impedance of the inductor. The change in impedance can be measured in terms of the phase angle, $\theta$, which is given by $$tg\theta = \frac{a^2\beta/b^2}{1-a^2(1-\alpha)/b^2}$$

where:

$a$ = radius of sample
$b$ = effective radius of coil $$\alpha = \frac{2}{ka}\left[\frac{ber(ka)bei'(ka) - bei(ka)ber'(ka)}{ber^2(ka) + bei^2(ka)}\right]$$

$$\beta = \frac{2}{ka}\left[\frac{bei(ka)bei'(ka) + ber(ka)ber'(ka)}{ber^2(ka) + bei^2(ka)}\right]$$

$$k = \left[\frac{\mu\omega}{\rho}\right]^{\frac{1}{2}}$$

$\mu$ = permeability
$\omega$ = angular frequency
$\rho$ = specific resistivity
$ber(x)$ = Bessel function, real, of $x$
$bei(x)$ = Bessel function, imaginary, of $x$ The power dissipated in the sample is given by:

$$P = \frac{\pi\rho caN^2I^2}{[M_o(ca)]^2}[ber(ca)ber'(ca) + bei(ca)bei'(ca)]$$

with $$c = \sqrt{\frac{8\pi^2 f}{\rho}}$$

$N$ = number of turns
$I$ = current
$[M_o(x)]^2 = ber^2(x) + bei^2(x)$

A number of measurement techniques based on this principle have been described. The techniques differ in the method used to measure the eddy currents, but can be generally grouped into five catagories:

1. Direct measurement of the phase angle, $\theta$, with an impedance bridge;
2. Measurement of the change in Q of a resonant circuit due to the resistive loading represented by the eddy current losses, using a "Q-meter;"
3. Measurement of the force exerted on the sample due to the flow of eddy currents in the magnetic field;
4. Rate of decay of eddy currents induced in the sample by a pulse current; and
5. Change in the cathode current of a high frequency oscillator due to the decrease in the feedback resulting from eddy current losses in the sample.

In all cases previously described, including the pulse technique, the sample to be measured has been held stationary in the inductor while the measurement was being made. Holding the inductor stationary while making the measurements as in the previously described methods has three major limitations:

1. Resistivities may only be measured up to the order of $10^2$ ohm-cm. With higher resistivity the signal is small and the circuit stabilities are not sufficient for measurement.
2. The results obtained are an average value of the resistivities of the various portions of the sample in the inductor. Thus, in an inhomogeneous sample, for example, a small piece of metal embedded in a nonconducting medium could produce exactly the same result as a uniform sample of poorly conducting material such as a semiconductor.
3. Measurements at very high or very low temperatures are difficult or impossible, because the inductor soon reaches the temperature of the sample, due to the necessary closeness of approach of the two, and its properties, especially the Q, change appreciably with temperature.

It is therefore an object of this invention to provide an apparatus and methods for electrodelessly measuring resistivity which do not have the above-listed limitations. Briefly the present invention is a method and apparatus in which a sample of limited length is moved through inductive means, such as a coil, during the measurement. The resulting change in electrical properties of the induction coil as a function of time, and therefore as a position of sample with respect to the coil, is recorded. In this manner the electrical conductivity along the length of the sample is measured. The signal is obtained as a pulse which can easily be amplified by conventional alternating current amplifier techniques or the like. The only limitation is that of signal/noise ratio and the dielectric relaxation time of the sample rather than that of the long term stability of the circuit, as is the case in steady state measurements. Furthermore, the sample is scanned by the inductor as it passes therethrough and, if the resulting signal is displayed on an oscilloscope as a function of time (or position), a resistivity profile is obtained, giving a graphical representation of the homogeneity.

The third difficulty, that of the temperature change of the inductor, is also overcome since the sample is moved from the furnace or coolant through the inductor so rapidly that there is a negligible temperature change of either sample or inductor before the measurement has been accomplished.

It is therefore among the objects of the invention to provide methods for continually measuring powdered or granular materials, and especially liquids, by dropping or moving them through or past a coil in portions or drops. Another object is to automatically sort, select, or reject coins based on the change in oscillator output as the coins are passed through or near the oscillator coil. A still further object of the invention is to automatically evaluate food stuffs, cosmetic items, body fluids (e.g. blood), industrial chemicals, plastics, oils, rubbers, rocket fuels, etc. based on their electrical resistance which can be easily measured by the methods of the invention. It is a further object of the invention to provide proportional control of temperature by placing an induction coil around a thermometer using an electrically conducting liquid as the material's volume changes with temperature.

It is a further object of the invention to provide methods and apparatus for determining relative motion or position of a body, and methods for determining such qualities as velocity, acceleration, force, frequency and amplitude of vibrations, pressure, expansion and the like. Another object is to provide methods and apparatus for utilizing capacitive as well as inductive coupling in obtaining measurements based on the principles of this invention.

Other objects, features, and advantages will become more readily understood from the following detailed description taken in conjunction with the appended claims and attached drawings in which:

Figure 14A:
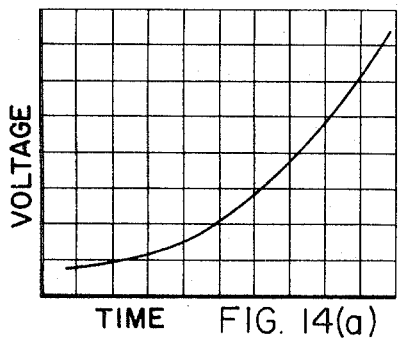
Figure 14B:
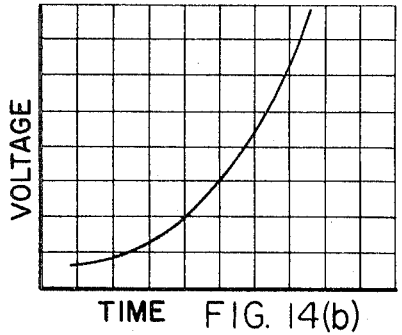
Figure 14C:
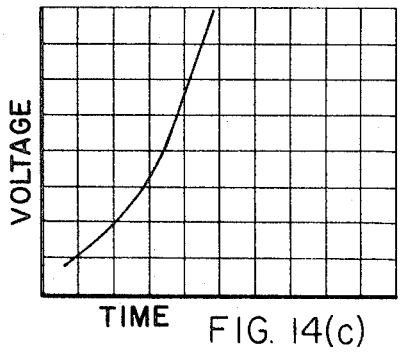
Figure 15:
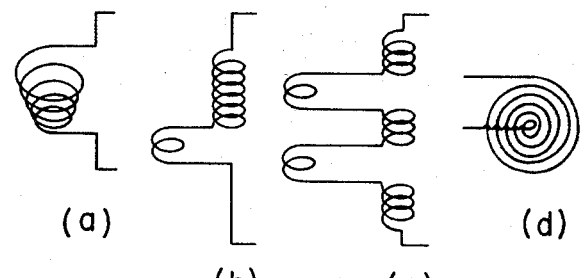
Figure 16:
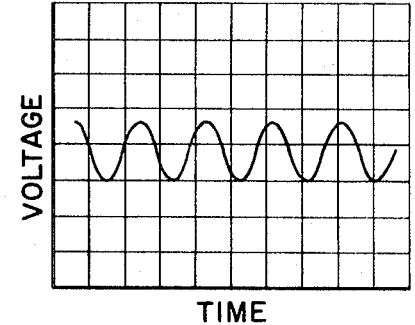
Figure 17:
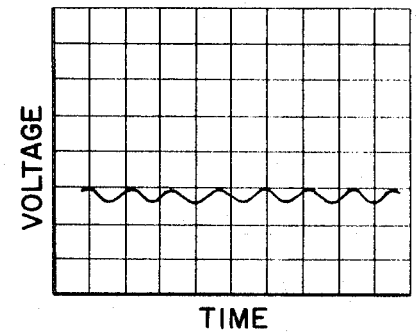
Figure 18:
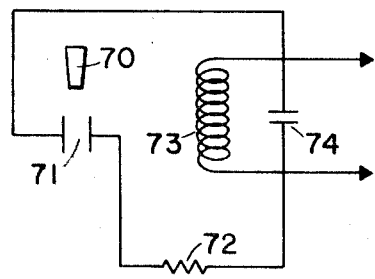
Figure 19:
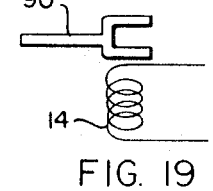

FIGS. 14(a)—(c) are graphical representations of the results obtained in measuring the motion of brass cones in accordance with the invention;

FIGS. 15(a)—(d) are schematic illustrations of induction coils suitable for use in the apparatus of the invention;

FIGS. 16 and 17 are graphical representations of results obtained in measuring vibratory motion in accordance with the invention;

FIG. 18 is a schematic illustration of a circuit for measurement of motion of a body in accordance with the invention using capacitive rather than inductive coupling; and FIG. 19 is a diagrammatic illustration of a tuning fork positioned adjacent a coil in accordance with one embodiment of the invention.

Figure 1:
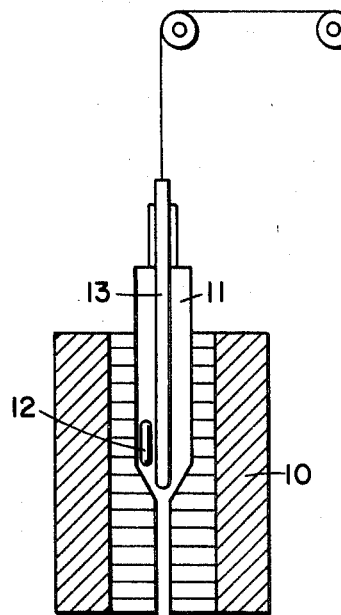
FIG. 1 is an elevational view, partially in section and partially schematic, of an apparatus suitable for practicing the invention.
Figure 1:
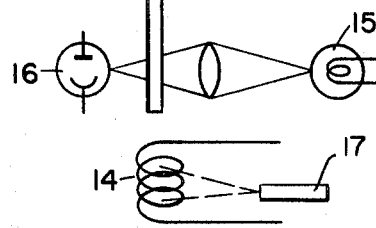

Referring to FIG. 1 there is illustrated an apparatus suitable for practicing the invention. The apparatus comprises a cylindrical furnace 10 mounted with its long axis vertical, a funnel-shaped drop tube 11 containing the sample 12 in the widened part thereof. By raising the rod 13, the mouth of the funnel is opened allowing the ampul containing the sample 12 to fall through the lower part of the funnel-shaped tube 11 which guides the sample ampul 12 causing it to fall through the oscillator coil 14. The energy from a lamp 15 is focused on a photocell 16. The sample 12 falling between the lamp and the photocell interrupts the beam to trigger the oscillograph sweep at the proper time.

Figure 5:
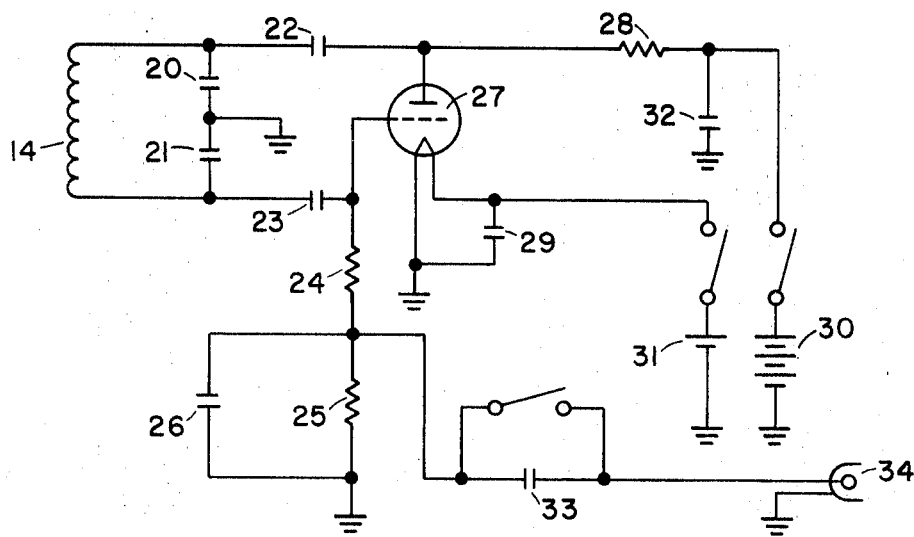
FIG. 5 is a schematic representation of the oscillator circuit used in the preferred embodiment of the invention.

The oscillator circuit used in the preferred embodiment of the invention is illustrated in FIG. 5. The main feature of the oscillator circuit used in accordance with the invention is the use of the grid current of the vacuum tube oscillator or the base current of a transistor oscillator as a measure of the resistance of the sample. In the circuit used in obtaining the examples discussed with reference to FIGS. 2, 3, 6 and 7, the inductor consisted of 14 turns of ½-mil diameter wire 1 cm. long and 1 cm. inside diameter. The operating frequency was about 14 mc./sec. The samples used had a diameter of about 0.5 cm. and a length of about 5 cm.

Although it will be understood that the specific values of the components of the circuit of FIG. 5 may be varied for optimization of the apparatus for use in specific applications, the values used in the specific apparatus discussed are given in table I.

TABLE I

| Reference numeral: | Description | Value |
| --- | --- | --- |
| 20 | Capacitor | 100 μμf. |
| 21 | do | 100 μμf. |
| 22 | do | 100 μμf. |
| 23 | do | 100 μμf. |
| 24 | Resistor | 5.6K ohms. |
| 25 | do | 4.7K ohms. |
| 26 | Capacitor | 0.001 μf. |
| 27 | Vacuum tube oscillator | DC-90. |
| 28 | Resistor | 10K ohms. |
| 29 | Capacitor | 0.001 μf. |
| 30 | Battery | 90 v. |
| 31 | do | 1.5 v. |
| 32 | Capacitor | 0.001 μf. |
| 33 | do | 1 μf. |
| 34 | Input to oscilloscope | |

Figure 4:
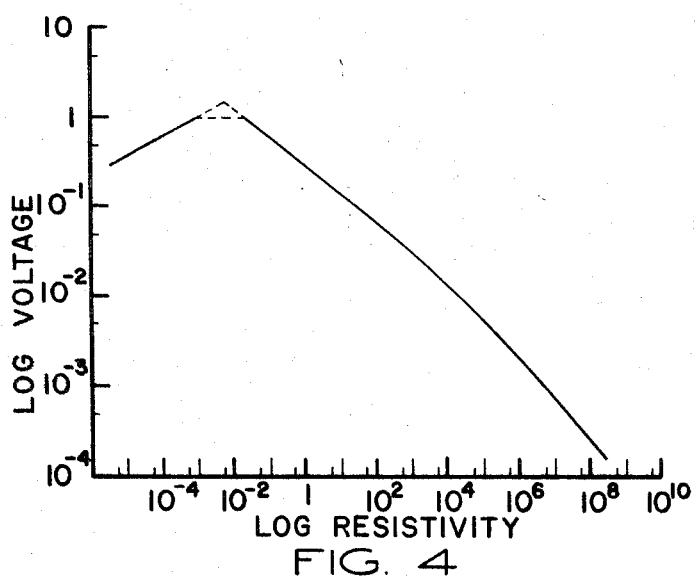
FIG. 4 is an experimentally determined calibration curve of peak voltage vs. resistivity of samples of known characteristics.

For determining values of specific resistively, the apparatus may be calibrated using samples of material of known resistivity. The results may be tabulated and plotted as log resistivity vs. log peak voltage to produce a calibration curve. A calibration curve for the specific apparatus described is shown in FIG. 4. For more detailed information on the calibration curve, reference may be had to "Electrodeless Measurement of Resistivities Over a Very Wide Range" by R. W. Haisty, *Review of Scientific Instruments*, Vol. 38, No. 2, (Feb. 1967).

FIG. 4 also illustrates the very large applicable range of this apparatus covering about 14 orders of magnitude. In spite of the extremely wide range, it was found that the experimental apparatus required no change, for example, in the induction coil or frequency of the oscillator to cover the entire range. It was only necessary to adjust the sensitivity of the oscilloscope.

Figure 2:
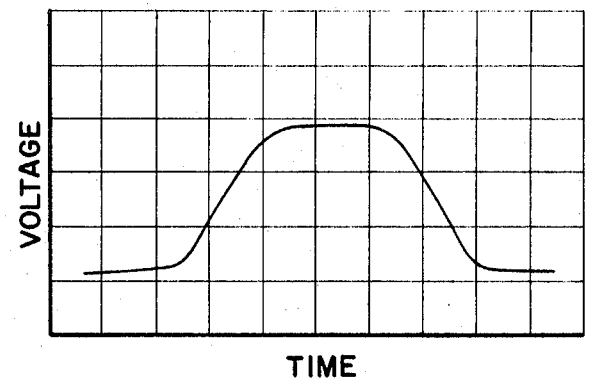
FIG. 2 is a graphical representation of the results obtained in the measurement of a homogeneous cylindrical sample of lead of 0.5 cm. diameter in accordance with the invention.
Figure 3:
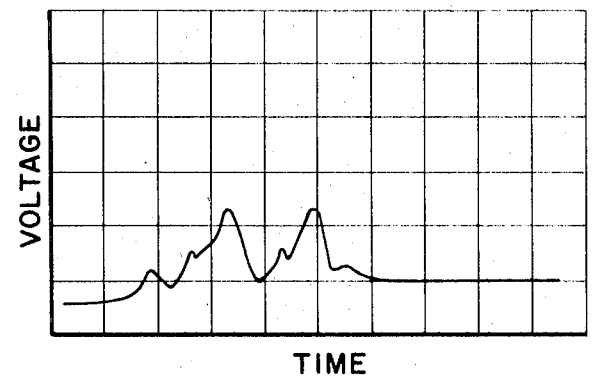
FIG. 3 is a graphical representation of the results obtained in the measurement of a very inhomogeneous sample of InSe of 0.5 cm. diameter in accordance with the invention.

As an example of the various uses to which may be made of the method and apparatus described herein, FIG. 2 is a graphical representation of the results obtained from the measurement of a homogeneous cylindrical sample of lead of 0.5 cm. diameter. As the sample passed through the coil 14 of FIG. 5, the change in voltage drop across resistor 25 is displayed on the oscilloscope 34 as a function of time. In FIG. 2 the vertical scale is $2\times10^{11}$ volts/unit and the horizontal is $5\times10^{13}$ seconds/unit. FIG. 3 represents the results obtained from the measurement of a very inhomogeneous sample of indium selenide of 0.5 cm. diameter. In FIG. 3 the vertical scale is $5\times10^{13}$ volts/unit and horizontal is $5\times10^{13}$ seconds/unit.

It should be noted that it is not necessary to move the sample through the coil but with the proper choice of size and shape of coil it is sufficient to move the ampul containing the sample past the coil on the outside thereof. Furthermore in some cases it is sufficient to move the sample into or near the coil and pull it back again. In this type of movement, especially pendulum-type motions of the sample in the vicinity or into the coil, can be used.

It should be noted that the apparatus described is very simple, stable and noise free. These qualities result from the fact that the measure of resistance of the material is a function of the grid current of a vacuum tube oscillator or the base current of a transistor oscillator. This is easily determined by measuring the voltage across resistor 25 during the measurement. Because of the extremely low noise level of the grid current, very high amplification of the signal is possible.

Figure 6:
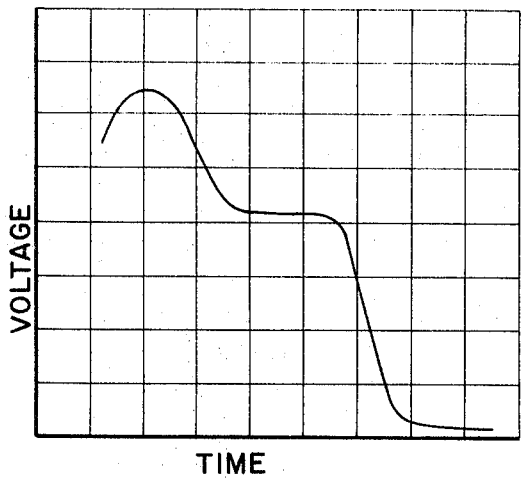
FIG. 6 is a graphical representation of the results obtained in the measurement of a melt of lead and aluminum at 760° C. in accordance with the invention.

The apparatus can also be used to determine miscibility gaps in liquid systems. FIG. 6 illustrates the signal received when a melt of approximately equal volumes of aluminum and lead at 760° C. is passed through the coil. At this temperature aluminum and lead are known to be immiscible. In FIG. 6 the vertical scale is $5\times10^{12}$ volts/unit and the horizontal is $5\times10^{13}$ seconds/unit.

Figure 7:
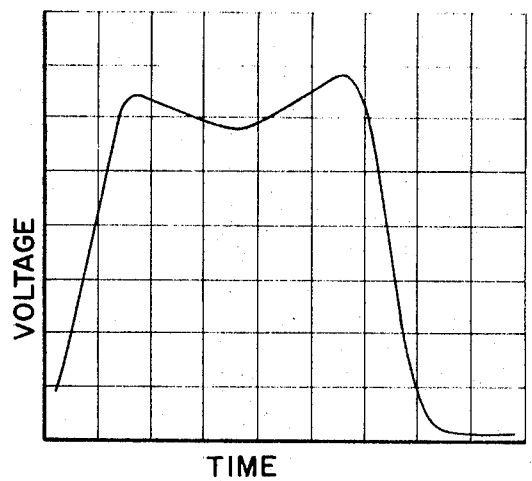
FIG. 7 is a graphical representation of the results obtained in the measurement of an aluminum wire of nonconstant diameter in accordance with the invention.

FIG. 7 illustrated the signal received when an aluminum rod of irregular shape is passed through the coil. The rod had been chemically etched to a tapered form of 1.15 mm. on one end, 1.23 mm. on the other end, and 0.95 mm. in the center. In FIG. 7 the vertical scale is $5\times10^{13}$ volts/unit and the horizontal is $5\times10^{13}$ seconds/unit.

From the examples given above it will be apparent to those skilled in the art that many technical applications, only a few of which are outlined here, are available for the method and apparatus of this invention.

One can, for example, continually sort passing objects based on their electrical resistance, homogeneity of electrical resistance, or the geometrical form or size. For example, one could automatically reject lumber containing pieces of metal at a saw works. Note that it is not always essential that the samples pass through the oscillator coil, but it is often sufficient for them to pass near a suitably formed coil. In another embodiment of the invention, the method and apparatus disclosed could be used to provide proportional control of temperature by placing the induction coil around a thermometer using an electrically conducting liquid as material whose volume changes with temperature. As this liquid approaches closer to the induction coil, it absorbs correspondingly more energy which causes a change in current distribution in the oscillator circuit of which the current coil is a part. The automatic control and regulation of the temperature is then not based on the sensing of a set point in a contact thermometer, but rather the sensor (the conducting column and induction coil) incompasses a control region. This makes it possible to set up circuit controls which prevent the oscillation of the temperature around the set point which is otherwise often difficult to avoid. The observation and control of the temperature by this method is given only as an example. Any variable which may be represented by the movement of an electrically conducting thread or column can be sampled and controlled in the same way.

Since the method of this invention relies on a contactless method of measuring the resistance of a sample, it is also possible to use the general features of the invention to measure photosensitive materials. The prior art methods of measuring photosensitivity relied on electrodes contacting the material which measure the dependence of the electrical conductivity on light or a stream of particles impacting the material. Such methods have several inherent problems. For example, the physical electrical contact is often not noise free and frequently shows a blocking effect. Also, if only a portion of the photoconductive material is illuminated, the resistance of the nonilluminated portion remains in series with the lower resistance of the illuminated portion so that only a limited change in resistance appears between the electrodes. Furthermore, possible new photoconducting materials had to be removed from the container in which they were prepared and provided with electrodes to be tested. All of these disadvantages can be obviated by the method of the present invention. The photosensitive material, while still in the original ampul in which it was prepared, may be placed in an induction coil, wave guide, or cavity resonator as described hereinabove and then irradiated with light or a stream of particles. The decrease in resistance in the sample is electrodelessly measured by the change in phase angle of the oscillator, with a Q-meter, or by the fact that increased absorption of energy by the sample reduces the amount of feedback in the oscillator circuit.

In this manner the problems of the appearance of blocking layers and noisy regions at the contacts are avoided. Furthermore, the higher conducting illuminated portions of the photoconductor are effectively measured in parallel with the low-conductivity nonilluminated portions and measured by the eddy currents induced in them by the high frequency currents of the oscillator. Portions of the sample which remain of high resistivity thus do not disturb the measurement. A special advantage of the method is that the homogeneity of a photoconducting sample can be easily tested by moving the light beam across the sample.

It should be noted that it is possible to test the photoconductivity of a newly prepared substance without removing it from the container in which it is prepared and, since electrical contact with the sample is not necessary, the photoconductivity of the sample can be measured at various temperatures or pressures.

This method can be applied in the same way when the electrical conductivity of the sample is increased by radiation with particles, for example, protons. It should be also noted that the method is especially suitable to the application of intermittent light or particle beams and therefore is highly applicable for the detection of modulated laser light. As an example of use of the method for measuring photoconductivity, the apparatus described above was used to measure photoconductivity of a piece of high resistivity gallium arsenide. The sample was placed in the coil 14. When the sample was illuminated with light from a small flashlight 17 at a distance of about 2 m., the oscilloscope recorded a change in voltage across resistor 25. It will be readily appreciated that flashlight 17 as illustrated in FIG. 1 may be any suitable means for bombarding the sample with energy such as high energy protons, visible light, infrared light; or the light 17 may be a laser. It will also be readily appreciated that the ampul 12 may be maintained in a fixed position within coil 14 and light source 17 scanned across the sample within the ampul as described hereinabove.

Figure 8:
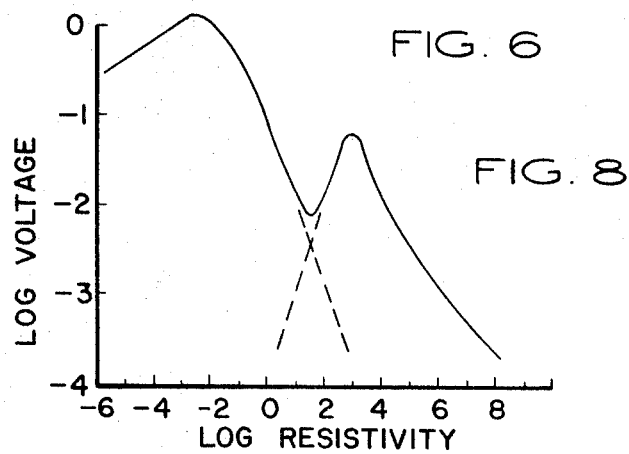
FIG. 8 is a calibration curve of voltage vs. resistivity showing maxima for both inductive coupling and capacitive coupling.

The description hereinabove has been restricted to inductive coupling of the test sample and a coil, waveguide or cavity resonator. It has been observed that for samples with a higher specific resistivity, coupling via the distributed capacitance of the coil can be of importance in addition to the inductive coupling to the sample. A plot of log output voltage vs. log specific resistivity such as that shown in FIG. 4 will actually have a second maximum due to the predominance of capacitive coupling at high resistivities, as shown in FIG. 8. It is then sometimes difficult to determine from this signal alone over a certain resistivity range whether the resistivity corresponds to the inductive or capacitive part of the curve.

In some cases it is desirable to determine the total electrical losses, ohmic as well as dielectric, in the sample. Examples are determination of total high frequency losses in insulating material or the determination of electrolyte concentrations. In prior art methods the samples have been held stationary in a measuring capacitor cell for this purpose, and the loss is determined with a resistance-capacitance bridge. Such methods are somewhat expensive and time consuming in practice and furthermore, give only an average value for the whole sample. The problems of the prior art can be overcome by using a modified form of the present invention in which a capacitor or a combination of a coil and capacitor are substituted for the induction coil 14 of FIG. 1.

Figure 9:
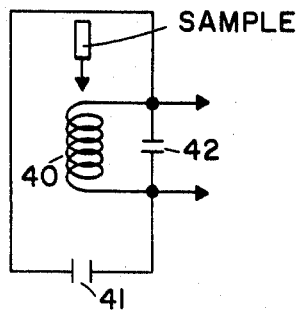
FIG. 9 is a schematic illustration of apparatus for sequential measurement of resistance with inductive and capacitive coupling.
Figure 10:
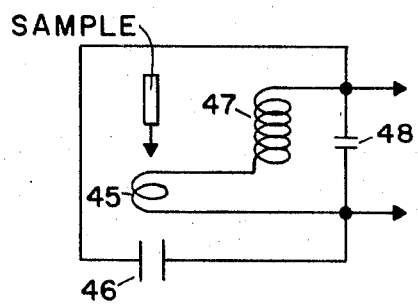
FIG. 10 is a schematic illustration of apparatus for sequential measurement of resistance with inductive and capacitive coupling.

The capacitor may consist of plates, discs, rings, spirals, hollow cylinders, or other similar forms. One arrangement of coil and capacitor combination is shown in FIG. 9 which illustrates a coil 40 which is connected in parallel with a pair of capacitors 41 and 42. Capacitor 41 is aligned so that a sample 1 falling through the coil 40 also falls between the plates of capacitor 41. An alternative embodiment is shown in FIG. 10 which shows a coil having a few turns removed from the remainder of the coil. In this embodiment the sample is dropped through the small coil 45, which is coupled in series with the large coil 47 and in parallel with capacitors 46 and 48. The sample falls between the plates of capacitor 46 after passing through the small coil 45. This arrangement allows a purely inductively coupled measurement, since the distributed capacitance of the small coil is negligibly small. One has, thus, the often practical possibility of passing the samples sequentially through the induction coil, or part of it, and a capacitor. Two signals are then obtained whereby the distribution of the signal obtained within an induction coil alone over the inductive and capacitive regions as shown in FIG. 8 can be determined.

Figure 11:
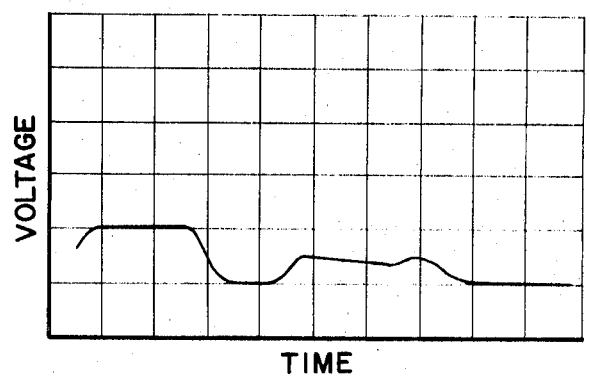
FIG. 11 is a graphical representation of the results obtained in the measurement of a sample of chalcogenide glass with the apparatus of FIG. 10.

FIG. 11 is a graphical representation of the signal received when a sample of chalcogenide glass was dropped through the arrangement illustrated in FIG. 10. The signal on the left side is due to inductive coupling. The signal on the right side is due to capacitive coupling.

Figure 12:
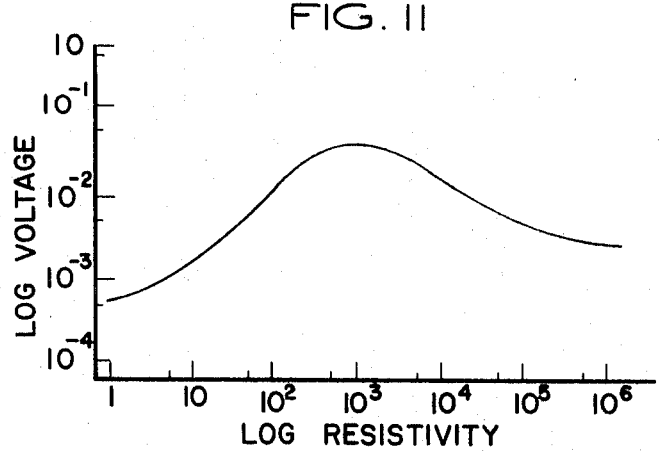
FIG. 12 is a calibration curve for the measurement of resistivity with purely capacitive coupling.

For determination of specific resistivity using purely capacitive coupling, a calibration curve may be determined experimentally as described above with reference to inductive coupling. A typical calibration curve obtained by plotting log voltage vs. log resistivity is shown in FIG. 12.

Figure 13:
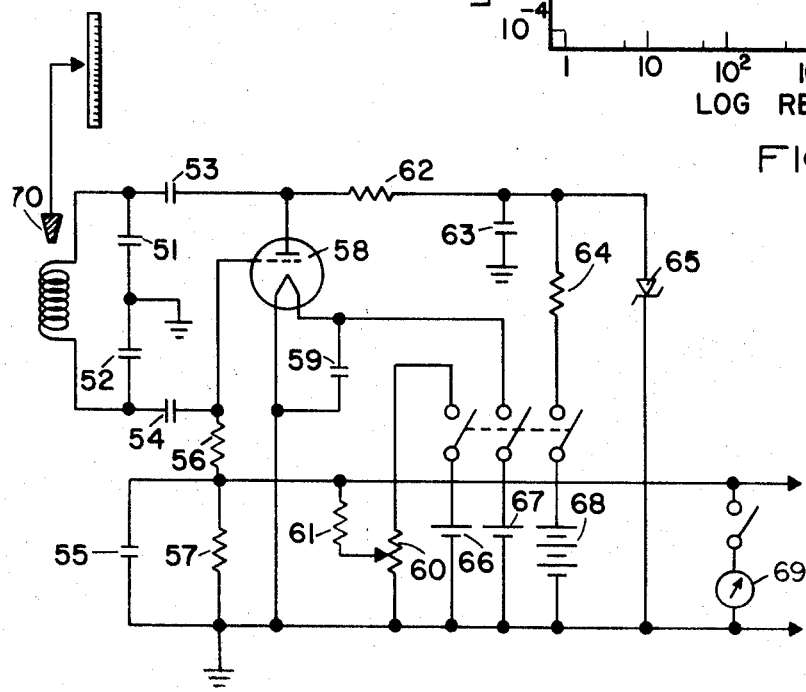
FIG. 13 is a schematic representation of the circuit for measuring position or motion of a body in accordance with the invention.

In an alternative embodiment of the invention, the circuit of FIG. 5, modified as shown in FIG. 13, may be used as an electrodeless electrical measurement of motion or position of an object. Such measurements can be used to determine quantities such as velocity, acceleration, force, frequency and amplitude of vibration, pressure, expansion, and the like.

Transducers for determining motion or position of an object using the change in inductance of an inductance coil when a core of high permeability is moved into or out of the coil are well known. Such transducers, such as the differential transformer, are satisfactory for many purposes but have certain limitations and are difficult and expensive to construct. Conventional transducers are particularly unsuitable for the measurement of rapid vibrations or motion because the core used to sense the motion has a rather large mass. Since the change in inductance depends upon the volume and permeability of the core, a very large volume of ferromagnetic material is used. Therefore, since a fairly large volume of ferromagnetic material is used, and since these materials have high densities, a large mass results. Furthermore, the relatively large inductance required for such methods precludes measurements of rapid or high frequency motion.

In accordance with this embodiment of the invention, above problems are solved by measuring power losses due to currents induced in the test object as function of its position relative to an induction coil. For this method it is practical to use a high frequency oscillator with a coil of low inductance. The use of high frequency is particularly advantageous because the induced high frequency currents flow essentially only in the surface of the test object. Furthermore, there is no need for the object to consist of a material with high permeability. Accordingly, thin shells or layers of any desired electrically conducting material (preferably one with low density for better high frequency response) can be used. The mass of the test object can therefore be reduced from the order of 10 grams or more for differential transformers to the order of a milligram. The measurement of very high as well as very low frequency vibrations are also possible even when they have a very low energy content.

In the preferred embodiment of the apparatus for measurement of the movement of position of an object in accord with the invention, the circuit of FIG. 5 is modified by adding a zener diode to stabilize the plate voltage of the oscillator for the measurement of extremely low movements and addition of a potentiometer to balance the output voltage for setting a zero point. The modified circuitry is illustrated in FIG. 13 and the values of components used in the specific apparatus described herein given in table II.

TABLE II

| Reference numeral: | Description | Value |
|---|---|---|
| 50 | Coil | |
| 51 | Capacitor | 100 μμf. |
| 52 | do | 100 μμf. |
| 53 | do | 100 μμf. |
| 54 | do | 100 μμf. |
| 55 | do | 0.001 μμf. |
| 56 | Resistor | 5.6K ohms. |
| 57 | do | 4.7K ohms. |
| 58 | Vacuum tube oscillator | DC-90. |
| 59 | Capacitor | 0.001 μμf. |
| 60 | Potentiometer | 1K ohm. |
| 61 | Resistor | 10K ohms. |
| 62 | do | Do. |
| 63 | Capacitor | 0.001 μμf. |
| 64 | Resistor | 5K ohms. |
| 65 | Zener diode | ZL-88. |
| 66 | Battery | 1.4 volts. |
| 67 | do | Do. |
| 68 | do | 140 volts. |
| 69 | Galvanometer | |

As an example of the operation of the apparatus described, brass cones (illustrated at 70 in FIG. 13) having opening angles of 19°, 29°, and 54°, respectively, were moved toward the coil as shown in FIG. 13 with a constant velocity of 0.4 millimeter per second.

It is easily possible to adjust the shape of the test object and/or coil in such a way that the signal obtained can vary in practically any desired manner, for example, linearly with the position of the test object relative to the coil. FIGS. 14(a)—(c) illustrate the signals displayed on the oscilloscope using the above-mentioned test objects. In each case the object was moved toward the coil at a constant velocity of 0.4 millimeter per second starting from a point 2.5 millimeter above the coil. In FIGS. 14(a)—14(c) the vertical scale is 20 mv./unit and the horizontal is 6.25 seconds/unit.

Alternate shapes for the induction means which may be used to produce desired signal position dependencies and/or to match the geometry of the test object are illustrated in FIGS. 15(a), 15(b), 15(c), and 15(d). The coil shape may be conical or flat spiral coils. Solenoidal forms with one or more turns used for measurement removed or pulled out away from the long axis of the coil and, if desired, rotated with respect to it, are also illustrated. It is especially practical to use this method for the sensing part of a counter (for example in a dial telephone or in assembly line operations) or as part of an electrical relay.

FIG. 16 illustrates the slow oscillation (2.6 c.p.s.) of a long elastic wire suspended above the coil. One end of the wire was clamped and the other end free to move just above the oscillator coil. FIG. 16 illustrates the good reproduction possible at low frequencies which is obtained by the very slowly oscillating wire. In FIG. 16 the vertical scale is 5 mv./unit and the horizontal is $2 \times 10^{11}$ seconds/unit.

FIG. 17 illustrates the oscillograph obtained by placing a vibrating aluminum tuning fork horizontally above the coil. In this example one arm of the fork 90 (FIG. 19) was positioned immediately above the oscillator coil 14 and perpendicular to the long axis thereof. The fork was oscillating at a frequency of approximately 2,000 c.p.s. Motion of the vibrating arm is shown in the oscillograph of FIG. 17 wherein vertical scale is 1 mv./unit and horizontal is $5 \times 10^{12}$ seconds/unit.

The method and apparatus of this embodiment of the invention may find a wide range of applications. For example the pulse beat of a living body is determined by detecting movement in the wall of the blood vessels and skin. Mechanically coupling this movement to a metal foil suspended in or on the oscillator coil would provide a means to follow the pulse beat electrically. As another example, one could measure acceleration in a very simple way by fastening a suitably shaped conducting object to a spring whose long axis lies in the direction of the acceleration. The force due to an acceleration will cause a proportional change in the length of the spring, allowing the position of the test object to change with respect to the oscillator coil, thus changing the amount of electrical energy which it absorbs from the oscillator and producing an electrical signal which is a function of the acceleration.

It is also possible to use the principles of this invention to construct a microphone or phonograph head for the electrical reproduction of sound such as speech, music, and the like. To demonstrate such an application a disc of aluminum foil was cemented to a very thin flexible cloth which was stretched across a rigid metal ring. The disc of aluminum foil was suspended immediately above the oscillator coil so that the aluminum could vibrate freely. It then absorbed more or less energy as it moved toward the coil or away from the coil. Vibrations of the aluminum foil in response to sound thus changed the electrical characteristics of the coil with response to the sound. The changes in the position of the foil were thus amplified by the oscillator and displayed on the oscilloscope.

The coupling between test object and high frequency oscillator can also be accomplished capacitively. For this purpose it is necessary to connect a capacitor to the tank circuit of the oscillator into or near which the test object may be moved as shown in FIG. 18. The elements of the capacitor may take various forms such as plates, discs, rings, spirals, hollow cylinders and the like. In the circuit illustrated in FIG. 18 the sample 70 is moved through capacitor 71. The capacitor is electrically connected in series with resistor 72 and in parallel with induction coil 73. Also illustrated in FIG. 18 is capacitor 74 for the tank circuit.

As the conducting test object 70 is moved between the elements of capacitor 71, the capacitance, and hence the power dissipated in resistor 72, increases. In addition thereto appreciable power is dissipated in the test object itself unless its resistance is several orders of magnitude smaller than the capacitive reactance of the effective coupling capacitance at the frequency used.

While the invention has been described with particular reference to specific examples embodying the principles thereof, it is to be understood that such description is to be construed as illustrative of the many applications thereof. Many other various applications utilizing the principles herein disclosed will become apparent to those skilled in the art. It is therefore to be understood that the forms of the invention described in detail is to be taken as preferred embodiments of same, and that various changes and manifications may be resorted to without departing from the spirit and scope of the invention.

What we claim is:

1. The method of measuring electrical resistivity of a limited length of material comprising the steps of:
   a. positioning said material adjacent inductance means in electrical communication with the control electrode of an active circuit component,
   b. moving said material relative to said inductance means,
   c. measuring variations in current through said control electrode which occur in response to said moving, and
   d. recording said variations in current as a function of time as said limited length of material moves with respect to said inductance means.

2. The method as set forth in claim 1 wherein said active circuit component is a vacuum tube, and said control electrode is the grid.

3. The method as set forth in claim 1 including the step of comparing the changes in said current with known current changes associated with materials of known resistivity to determine variations in resistivity of said limited length of material.

4. The method as set forth in claim 1 wherein said limited length of material is moved along its long axis through said inductance means.

5. The method as set forth in claim 5 and including the step of comparing the changes in said current with known current changes associated with material of known resistivities to determine the resistivity of said limited length of material at any point along said long axis.

6. The method of measuring electrical resistivity of a limited length of material comprising the steps of:
   a. positioning said material in fixed relation with capacitive reactance means in electrical communication with the control electrode of an active circuit component,
   b. moving said material relative to said capacitive reactance means,
   c. measuring variations in current through said control electrode which occur in response to said moving, and
   d. recording said variations in current as a function of time as said limited length of material moves with respect to said capacitive reactance means.

7. The method as set forth in claim 6 including the step of comparing the changes in said current with known current changes associated with materials of known resistivity to determine variations in resistivity of said limited length of material.

8. The method as set forth in claim 6 wherein said limited length of material is moved along its long axis through said capacitive reactance means.

9. The method as set forth in claim 8 and including the step of comparing the changes in said current with known current changes associated with material of known resistivities to determine the resistivity of said limited length of material at any point along said long axis.

10. The method of measuring photoconductivity of a sample of material comprising the steps of:
    a. positioning said sample adjacent inductance means in electrical communication with the control electrode of an active circuit component,
    b. bombarding at least a part of said sample with an energy source, and
    c. measuring the change in current through said control electrode in response to said bombarding.

11. The method as set forth in claim 10 wherein said energy source is a source of high-energy protons.

12. The method as set forth in claim 10 wherein said energy source is a laser.

13. The method as set forth in claim 10 wherein said energy source is a source of visible light.

14. The method as set forth in claim 10 wherein said energy source is a source of infrared energy.

15. The method of claim 10 wherein said energy source is scanned along the length of said sample of material and the change in the current through said electrode is measured as a function of position of impact of said energy source.

16. Apparatus for measuring the electrical resistivity of a sample of material comprising:
    a. inductance means,
    b. capacitive reactance means,
    c. oscillator circuit means electrically connected with said capacitive reactance means and said inductance means, and
    d. means for sequentially moving said sample relative to said inductance means and said capacitive reactance means, whereby energy losses in said sample of material resulting from inductive and capacitive coupling of said sample and said inductance means and said capacitive reactance means, respectively, sequentially changes the electrical characteristics of said inductance means and said capacitive reactance means.

17. The apparatus set forth in claim 20 and further including means for controlling the temperature of said sample of material.

18. Apparatus for measuring the electrical resistivity of a limited length of material comprising:
    a. inductance means;
    b. means for moving said limited length of material relative to said inductance means, whereby energy losses in said limited length of material resulting from inductive coupling of said limited length of material and said inductance means changes the electrical characteristics of said inductance means;
    c. oscillator circuit means electrically connected with said inductance means for measuring changes in the electrical characteristics of said inductance means which occur as a result of movement of said limited length of material relative to said inductance means, including an active circuit component, said inductance means being in electrical communication with the control electrode of said active circuit component;
    d. means for measuring variations in current through said control electrode which occur in response to said moving; and
    e. means for recording said variations in current as a function of time as said limited length of material moves with respect to said inductance means.

19. The apparatus set forth in claim 18 and further including temperature controlling means for controlling the temperature of said sample of material.

20. Apparatus for measuring the electrical resistivity of a limited length of material comprising:
    a. capacitive reactance means;
    b. means for moving said limited length of material relative to said capacitive reactance means, whereby energy losses in said limited length of material resulting from capacitive coupling of said limited length of material and said capacitive reactance means changes the electrical characteristics of said capacitive reactance means;

c. oscillator circuit means electrically connected with said capacitive reactance means for measuring changes in the electrical characteristics of said capacitive reactance means which occur as a result of movement of said limited length of material relative to said capacitive reactance means, including an active circuit component, said capacitive reactance means being in electrical communication with the control electrode of said active circuit component;

d. means for measuring variations in current through said control electrode which occur in response to said moving; and e. means for recording said variations in current as a function of time as said limited length of material moves with respect to said capacitive reactance means.

21. The method of determining uniformity of electrical characteristics of materials comprising the steps of:

a. continuously moving samples of said materials in a fixed path;

b. positioning inductance means electrically connected with the control electrode of an active circuit component in fixed relation to said path;

c. positioning capacitive reactance means electrically connected with said control electrode in fixed relation to said path, whereby said samples of materials are moved sequentially through said inductance means and said capacitive reactance means; and d. measuring the change in current through said control electrode in response to each sample of material passing along said fixed path.

22. Apparatus for determining the change of position of a body comprising:

a. inductance means positioned near said body and stationary with respect to said body;

b. circuit mans electrically connected with said inductance means, said circuit means including an active circuit component, the control electrode of which is electrically connected to said inductance means;

c. means for measuring the change in current in said control electrode which occur in response to change of position of said body; and d. means for imparting oscillatory motion to said body.

UNITED STATES PATENT OFFICE
CERTIFICATE OF CORRECTION

Patent No. 3,586,966  Dated June 22, 1971

Inventor(s) Robert W. Haisty et al.

It is certified that error appears in the above-identified patent and that said Letters Patent are hereby corrected as shown below:

Column 4, line 47 and Column 8, line 31, "$2 \times 10^{11}$", each occurrence, should read -- $2 \times 10^{-1}$ --. Column 4, lines 47, 50, 51 and 74, and Column 5, lines 5 and 6, "$5 \times 10^{13}$", each occurrence, should read -- $5 \times 10^{-3}$ --. Column 4, line 74 and Column 8, line 39, "$5 \times 10^{12}$", each occurrence, should read -- $5 \times 10^{-2}$ --. Column 7, line 52, "low" should read -- slow --. Column 9, line 45, "5" should read -- 4 --.

Signed and sealed this 23rd day of May 1972.

(SEAL)
Attest:

EDWARD M. FLETCHER, JR.
Attesting Officer

ROBERT GOTTSCHALK
Commissioner of Patents